United States Patent [19]

Yukuta et al.

[11] 4,255,526

[45] Mar. 10, 1981

[54] METHOD OF PRODUCING A MOISTURE- AND HEAT-RESISTANT FLEXIBLE POLYURETHANE FOAM

[75] Inventors: Toshio Yukuta; Hiroya Fukuda; Seiji Ishii, all of Yokohama, Japan

[73] Assignee: Bridgestone Tire Company Limited, Tokyo, Japan

[21] Appl. No.: 70,081

[22] Filed: Aug. 27, 1979

[30] Foreign Application Priority Data

Aug. 25, 1978 [JP] Japan .................................. 53-102876

[51] Int. Cl.³ ...................... C08G 18/14; C08G 18/32; C08G 18/38
[52] U.S. Cl. ..................................... 521/108; 521/128
[58] Field of Search ................................ 521/128, 108

[56] References Cited

U.S. PATENT DOCUMENTS

| 3,298,995 | 1/1967 | Bloor et al. ...................... 260/45.85 |
| 3,798,198 | 3/1974 | Hole ..................................... 521/128 |

FOREIGN PATENT DOCUMENTS 1148740 5/1963 Fed. Rep. of Germany ........... 521/128

Primary Examiner—H. S. Cockeram
Attorney, Agent, or Firm—Sughrue, Rothwell, Mion, Zinn and Macpeak

[57] ABSTRACT

A moisture- and heat-resistant flexible polyurethane foam, which is free from lowering of the foam hardness due to moisture absorption during or after the production of the foam under a high temperature and high humidity condition and free from development of scorch during the production of the foam, can be obtained by adding an amino acid or an amino acid analogous compound to a raw material mixture, and foaming the resulting mixture.

6 Claims, 1 Drawing Figure

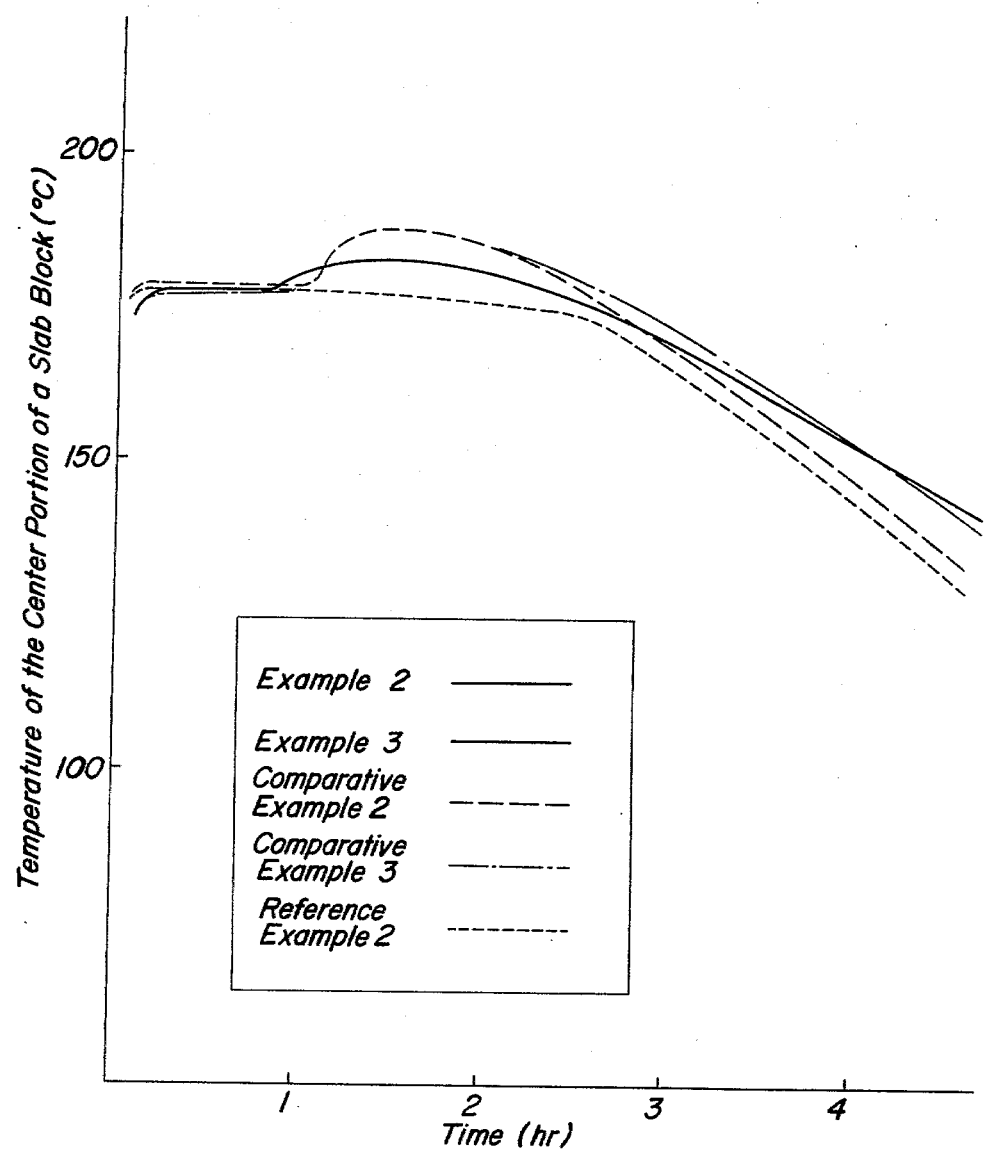

METHOD OF PRODUCING A MOISTURE- AND HEAT-RESISTANT FLEXIBLE POLYURETHANE FOAM

BACKGROUND OF THE INVENTION

1. Field of the Invention

The present invention relates to a method of producing a moisture- and heat-resistant flexible polyurethane foam, and more particularly to a method of producing a moisture- and heat-resistant flexible polyurethane foam, which is free from lowering of the foam hardness due to moisture absorption during or after the production of the foam under a high temperature and high humidity condition and free from development of scorch during the production of the foam.

2. Description of the Prior Art

Flexible polyurethane foam is produced in the form of various products by selecting properly the kind of raw materials and the production methods. Among the production methods, continuous slab foaming process is important for mass production at present. A large amount of cushioning materials for furnitures and beds are produced from the slab stock of flexible polyurethane foam produced by this continuous slab foaming process, through cutting, sewing, riveting, adhesion and the like. In the continuous slab foaming process, a slab stock having a larger dimension is produced more inexpensively, and a flexible polyurethane foam slab stock having a cross-section of about 2 m width and of about 1 m height is produced at present.

Flexible polyurethane foams produced under a high temperature and high humidity condition (particularly, in summer) have a hardness lower than that of foams produced under a dry condition and further are subject to scorch.

However, the mechanism of the above described phenomena have not yet been clarified, and a summer formulation for the reaction in summer has hitherto been empirically set. As the summer formulation, the following formulations have hitherto been used.

(1) A polyol containing a stiffness element incorporated into the polyol itself is used. For example, a blend of a polyol and a polyol grafted with a monomer, such as styrene, acrylonitryl or the like, is used as a polyol component.

(2) Polyurethane foam-forming reaction is carried out at a high isocyanate index of 120-150, which is higher than the commonly used isocyanate index of about 105. (Isocyanate index is a value, which is one hundredfold value of the ratio of the isocyanate group equivalent of an isocyanate compound to the hydroxyl group equivalent of a compound having active hydrogen.)

However, in the method using a blend of a polymer and the polymer polyol, the polymer polyol is a special polyol, and therefore the resulting flexible polyurethane foam is expensive. While, in the method of forming a flexible polyurethane foam at a high isocyanate index, the resulting polyurethane foam is expensive and further scorch is apt to occur. Therefore, there has not yet been found a satisfactory technique for producing a flexible polyurethane foam inexpensively without lowering the foam hardness and without causing scorch under a high temperature and high humidity condition.

SUMMARY OF THE INVENTION

The inventors have made various investigations in order to prevent the lowering of the hardness of flexible polyurethane foam and to prevent the development of scorch under a high temperature and high humidity condition, and accomplished the present invention. That is, the inventors have investigated the mechanism of secondary heat generation due to moisture (refer to Examples 2 and 3), which is one of the causes for lowering of foam hardness and for development of scorch in the production of a flexible polyurethane foam under a high temperature and high humidity condition, and have found that the lowering of foam hardness and the development of scorch can be suppressed by compounding an amino acid or an amino acid analogous compound into the reaction system as an additive. Hereinafter, amino acid and amino acid analogous compound may be merely referred to as amino acid in the specification.

That is, a feature of the present invention is the provision, in a method of producing a moisture- and heat-resistant flexible polyurethant foam from a raw material mixture of a polyhydroxyl compound with an organic polyisocyanate, water, a catalyst, a surfactant and a foaming agent, of an improvement comprising adding 0.01-5 parts by weight based on 100 parts by weight of said polyhydroxyl compound of an amino acid or an amino acid anaglogous compound to the raw material mixture as an additive, and foaming the resulting mixture.

BRIEF DESCRIPTION OF THE DRAWING

The FIGURE shows curves illustrating the change of temperature with the lapse of time of the center portions of foam blocks produced in Examples 2 and 3, Comparative Examples 2 and 3, and Reference Example 2.

DESCRIPTION OF THE PREFERRED EMBODIMENTS

The inventors have found out the following phenomena when a large slab stock of flexible polyurethane foam is produced under a high temperature and high humidity condition. Moisture in the foaming environment is penetrated into the interior of the foam block and dispersed in the foam just after the completion of the foaming reaction, and in result, the moisture reacts with unreacted isocyanate remaining in the interior of the foam block to cause secondary heat generation due to moisture (refer to Examples 2 and 3), and hence scorch occurs. Moreover, the main chain of the polyurethane is broken by the thermal hydrolysis of urethane bond due to the moisture, and hence the foam hardness is lowered.

When amino acid is added to an ordinary formulation for flexible polyurethane foam which causes secondary heat generation in the foam due to moisture and the lowering of the foam hardness under a high temperature and high humidity condition, a moisture- and heat-resistant flexible polyurethane foam can be produced which is very small in both the secondary heat generation due to moisture and the lowering of the foam hardness.

The reason why amino acid exhibits the above described effect is not clear, but is probably as follows. The amino acid reacts physically or chemically with moisture penetrated into the interior of a foam block to suppress the exothermal reaction of the moisture with unreacted isocyanate and further to prevent the thermal hydrolysis of urethane bond by the moisture.

When amino acid is compounded to a formulation for flexible polyurethane foam, not only the lowering of foam hardness due to moisture absorption at the foaming under a high temperature and high humidity condition can be prevented, but also the moisture resistance of the resulting foam is higher than that of a conventional foam.

The amino acid to be used in the present invention is not particularly limited, and commercial available amino acid can be used. As the amino acid, there can be used L-glutaminic acid, D-glutaminic acid, L-aspartic acid, DL-serine, L-alanine, DL-threonine, DL-valine, L-arginine and the like. As the amino acid analogous compound, there can be used hydantoin, hydantoic acid, and their derivatives, uric acid, L-pyrrolidone-5-carboxylic acid, DL-pyrrolidone-5-carboxylic acid and the like. Among the above described amino acids, L- or D-glutaminic acid and L-aspartic acid are preferable, and L-glutaminic acid is particularly preferable. Among the above described amino acid analogous compounds, DL-pyrrolidone-5-carboxylic acid is preferable, because the acid is effective for suppressing the secondary heat generation. The amino acid or aminio acid analoguous compound is used alone or in admixture in an amount of 0.01–5 parts by weight, preferably 0.3–3 parts by weight, based on 100 parts by weight of polyhydroxyl compound.

When the amount of amino acid is less than 0.01 part by weight, the effect of amino acid does not appear, while even when the amount of amino acid is more than 5 parts by weight, the effect of amino acid does not substantially increase and the use of amino acid in such a large amount is disadvantageous in view of the production cost of the foam. Accordingly, amino acid is advantageously used within the above described range. Amino acid can be compounded to the raw material mixture by any means. For example, amino acid can be dispersed in polyol by means of an ink roll or the like.

In the foaming under a high temperature and high humidity condition, an antioxidant is not effective for preventing the lowering of hardness of the resulting flexible polyurethane foam, but is effective for preventing scorch due to the oxidation reaction for the foam. Therefore, antioxidant can be occasionally used together with amino acid. As the antioxidant, a mixture of 4,4′-bis (α,α-dimethylbenzyl)diphenylamine with triphenyl phosphite is particularly preferable.

In the method of the present invention, commonly known polyhydroxyl compounds, polyisocyanate, catalyst, surfactant, foaming agent and other additives, which are commonly used in the conventional method of producing flexible polyurethane foam, can be used.

The following examples are given for the purpose of illustration of this invention and are not intended as limitations thereof.

EXAMPLE 1
COMPARATIVE EXAMPLE 1 AND REFERENCE EXAMPLE 1

The method of the present invention will be explained in detail by simulation foaming by a hand mixing method, which can exhibit the foaming behavior in the machine foaming of a large size block of a flexible polyurethane foam in a high reproducibility and in a small scale. That is, it has been found that, when a liquid raw material mixture having previously adjusted its temperature is formed into a flexible polyurethane foam having a block size of 1 m length×1 m width×1 m height by a hand mixing method (Jiffy mixer, 5,800 rpm) and the paper mold is removed and then the foam block is left to stand, the foaming behavior of the slab block at the center portion has a high correlation to the foaming behavior of a large size slab block in a machine foaming. Therefore, the foaming reactions for the foams in Example 1, Comparative Example 1 and Reference Example 1 shown in the following Table 1 and the following examples were carried out by this hand mixing method.

Further, in order to control the absolute humidity in the foaming environment, the above described foaming reaction was carried out in a Besthel prefabricated type air-conditioned room (made by Besthel K.K., temperature range: +5°–+60° C., humidity range: 30–100%).

| Common compounding recipe | (Parts by weight) |
|---|---|
| Poly(oxypropylene-oxyethylene)triol (made by Dow Chemical Co., CP-3010, m.w. 3,000, OH value 55.4) | 100 |
| Water | 5.5 |
| Triethylene diamine | 0.05 |
| Stannous octoate | 0.18 |
| Silicone surfactant (made by Goldschmidt Co., BF-2370) | |
| TDI-80* (Index) | 67.2(105) |

*A mixture of 80 parts by weight of 2,4-toluene diisocyanate and 20 parts by weight of 2,6-toluene diisocyanate.

TABLE 1

| | | Example 1 | Comparative Example 1 | Reference Example 1 |
|---|---|---|---|---|
| Additive (parts by weight) | BDPA* | 0.50 | — | — |
| | Triphenyl phosphite | 0.25 | — | — |
| | L-Glutaminic acid | 0.50 | — | — |
| | Temperature of liquid raw material mixture (°C.) | 25.0 | 25.0 | 26.0 |
| Foaming environment | Temp. × rel. humidity (abs. humidity: kg H$_2$O/kg air) | 30° C. × 100% RH (0.027) | 30° C. × 100% RH (0.027) | 21° C. × 45% RH (0.009) |
| Physical properties | Foam density (g/cm$^3$) | 0.0190 | 0.0194 | 0.0190 |
| | 25% ILD hardness (kg/200 mm diameter) | 10.0 | 8.8 | 10.6 |
| | Compression set** (%) | 3.6 | 4.0 | 2.5 |
| | Air permeability*** (m$^3$/min (ft$^3$/min)) | 0.116 (4.1) | 0.12 (4.3) | 0.125 (4.4) |

*4,4′-bis(α,α-dibenzyl)diphenylamine
**70° C., 22 hr, 50% compression
***measured by a Dow air flow meter In Example 1, a foam was produced in the presence of L-glutaminic acid and other additions of antioxidants (BDPA and triphenyl phosphite) as shown in Table 1. It can be seen from the comparison of Reference Example 1 with Comparative Example 1 in Table 1 that, when the humidity of foaming environment is high, the hardness (25% ILD) of the resulting foam is low. However, it can be seen from Table 1 that, when a foaming reaction is carried out in the presence of L-glutaminic acid as shown in Example 1, even under a high temperature and high humidity condition the resulting foam has substantially the same hardness as that of a foam produced under a low humidity condition (Reference Example 1).

EXAMPLES 2 AND 3

COMPARATIVE EXAMPLES 2 AND 3, AND REFERENCE EXAMPLE 2

Foams shown in the following Table 2 were produced by the same hand mixing method as described in Example 1.

The FIGURE shows the result of experiment with respect to the effect of amino acid on the prevention of secondary heat generation in a foam due to moisture carried out in Examples 2 and 3, Comparative Examples 2 and 3, and Reference Example 2. It can be seen from the comparison of Comparative Example 2 with Reference Example 2 that, when the humidity of foaming environment is high, the temperature (measured by means of a thermocouple) of the center portion of the resulting foam block begins to rise again after about one hour of the foaming as illustrated in the FIGURE. However, even when a foaming reaction is carried out in the presence of antioxidants (BDPA and triphenyl phosphite) as shown in Comparative Example 3, the secondary heat generation still occurs. Therefore, it can be seen that this heat generation is not caused due to the thermal oxidation. That is, this secondary heat generation is a secondary heat generation due to moisture, which is caused by the reaction of unreacted TDI with environmental moisture penetrated into the interior of the foam block from the foaming environment and dispersed therein. When a foaming reaction is carried out in the presence of L-glutaminic acid under a high temperature and high humidity condition as shown in Examples 2 and 3, the secondary heat generation due to moisture can be suppressed as illustrated in the FIGURE. That is, it has been proved that L-glutaminic acid is effective for suppressing the reaction of unreacted TDI with environmental moisture penetrated into the interior of a foam block and dispersed therein.

It has been again proved from the comparison of Comparative Example 2 with Reference Example 2 in Table 2 that, when the moisture content in the foaming environment is high, the hardness of the resulting foam is low. Further, it can be seen from Comparative Examples 2 and 3 that anti-oxidants (BDPA and triphenyl phosphite) are not effective for preventing the lowering of the hardness of a foam formed by foaming under a high temperature and high humidity condition. However, when a foaming reaction is carried out under a high temperature and high humidity condition in the presence of L-glutaminic acid as described in Examples 2 and 3, the resulting foam has substantially the same high hardness as that of a foam formed under a low humidity condition shown in Reference Example 2. That is, it has been proved that L-glutaminic acid is effective for suppressing the thermal hydrolysis of flexible polyurethane foam.

It can be seen from the above experiments that L-glutaminic acid, generally amino acid, acts physically or chemically upon the environmental moisture to suppress the penetration of the moisture into the interior of a foam, and as the result (1) a reaction of the moisture with unreacted TDI in the interior of a foam block is suppressed to decrease the secondary heat generation due to moisture, and at the same time, (2) thermal hydrolysis, due to moisture, of urethane bond in the chemical structure of the foam is suppressed.

| Common compounding recipe | (Parts by weight) |
|---|---|
| Poly(oxypropylene-oxyethylene)triol (made by Dow Chemical Co., CP-3010, m.w. 3,000, OH value 55.4) | 100 |
| Water | 5.5 |
| Triethylene diamine | 0.05 |
| Stannous octoate | 0.20 |
| Silicone surfactant (made by Goldschmidt Co., BF-2370) | 1.4 |
| TDI-80 (Index) | 67.2 (105) |

TABLE 2

| | | Example 2 | Example 3 | Comparative Example 2 | Comparative Example 3 | Reference Example 2 |
|---|---|---|---|---|---|---|
| Additive (parts by weight) | BDPA | 0.50 | — | — | 0.50 | — |
| | Triphenyl phosphite | 0.25 | — | — | 0.25 | — |
| | L-Glutaminic acid | 0.50 | 0.50 | — | — | — |
| | Temperature of liquid raw material mixture (°C.) | 21.5 | 21.5 | 21.5 | 21.5 | 21.5 |
| Foaming environment | Temp. × rel. humidity (abs. humidity: kg H$_2$O/kg air) | 38° C. × 75% RH (0.032) | 38° C. × 75% RH (0.032) | 38° C. × 75% RH (0.032) | 38° C. × 75% RH (0.032) | 10° C. × 75% RH (0.006) |
| Physical properties | Foam density (g/cm$^3$) | 0.0185 | 0.0191 | 0.0180 | 0.0189 | 0.0188 |
| | 25% ILD hardness (kg/200 mm diameter) | 9.8 | 10.1 | 8.3 | 8.6 | 10.2 |
| | Compression set (%) | 2.5 | 2.6 | 3.0 | 2.7 | 1.9 |
| | Air permeability (m$^3$/min (ft$^3$/mm)) | 0.153 (5.4) | 0.158 (5.6) | 0.181 (6.4) | 0.192 (6.8) | 0.161 (5.7) |

EXAMPLE 4 AND COMPARATIVE EXAMPLE 4

Foams shown in the following Table 3 were produced by the same hand mixing method as described in Example 1.

It can be seen from Table 4 that a foam produced in the presence of L-glutaminic acid as shown in Example 4 under a high temperature and high humdity condition has a hardness higher than that of a foam produced without the addition of L-glutaminic acid as shown in Comparative Example 4 under the same high temperature and high humidity condition.

| Common compounding recipe | (Parts by weight) |
|---|---|
| Poly(oxypropylene-oxyethylene)tiol (made by Dow Chemical Co., CP-3010, m.w. 3,000, OH value 55.4) | 100 |
| Water | 6.0 |
| Triethylene diamine | 0.05 |
| Stannous octoate | 0.20 |
| Silicone surfactant (made by Goldschmidt Co., BF-2370) | 1.4 |
| Trichloromonofluoromethane | 5.0 |
| TDI-80 (Index) | 72.45 (105) |

TABLE 3

|  |  | Example 4 | Comparative Example 4 |
|---|---|---|---|
| Additive (parts by weight) | BDPA | 0.50 | — |
|  | Triphenyl phosphite | 0.25 | — |
|  | L-Glutaminic acid | 0.50 | — |
| Temperature of liquid raw material mixture (°C.) |  | 17.5 | 17.5 |
| Foaming environment | Temp. × rel. humidity (abs. humidity: kg H$_2$O/kg air) | 30° C. × 100% RH (0.027) | 30° C. × 100% RH (0.027) |
| Physical properties | Foam density (g/cm$^3$) | 0.0168 | 0.0163 |
|  | 25% ILD hardness (kg/200 mm diameter) | 8.2 | 7.2 |
|  | Compression set (%) | 3.2 | 3.4 |
|  | Air permeability (m$^3$/min (ft$^3$/min)) | 0.19 (6.7) | 0.221 (7.8) |

EXAMPLES 5–9 AND COMPARATIVE EXAMPLE 5

Foams shown in the following Table 4 were produced by the same hand mixing method as described in Example 1.

It can be seen from Table 4 that a foam produced in the presence of an amino acid analogous compound under a high temperature and high humidity condition has a hardness higher than that of a foam produced without the addition of an amino acid analogous compound under the same high temperature and high humidity condition (Comparative Example 5).

| Common compounding recipe | (Parts by weight) |
|---|---|
| Poly(oxypropylene-oxyethylene)triol (made by Dow Chemical Co., CP-3010, m.w. 3,000, OH value 55.4) | 100 |
| Water | 6.5 |
| Triethylene diamine | 0.05 |
| Stannous octoate | 0.20 |
| Silicone surfactant (made by Goldschmidt Co., BF-2370) | 1.4 |
| TDI-80 (Index) | 77.7 (105) |

TABLE 4

|  |  | Example 5 | Example 6 | Example 7 | Example 8 | Example 9 | Comparative Example 5 |
|---|---|---|---|---|---|---|---|
| Additive (parts by weight) | Hydantoin | 0.50 | — | — | — | — | — |
|  | Hydantoic acid | — | 0.50 | — | — | — | — |
|  | Uric acid | — | — | 0.50 | — | — | — |
|  | DL-Pyrrolidone-5-carboxylic acid | — | — | — | 0.50 | — | — |
|  | L-Glutaminic acid | — | — | — | — | 0.50 | — |
| Temperature of liquid raw material mixture (°C.) |  | 23.0 | 23.0 | 23.0 | 23.0 | 23.0 | 23.0 |
| Foaming environment (absolute humidity) |  | | | 30° C. × 100% RH (0.027 kg H$_2$O/kg air) | | | |
| Physical properties | Foam density (g/cm$^3$) | 0.0161 | 0.0163 | 0.0165 | 0.0168 | 0.0169 | 0.0165 |
|  | 25% ILD hardness (kg/200 mm diameter) | 11.0 | 10.4 | 11.2 | 11.3 | 11.4 | 9.5 |
|  | Compression set (%) | 4.0 | 3.9 | 3.5 | 2.7 | 2.6 | 5.0 |
|  | Air permeability (m$^3$/min (ft$^3$/min)) | 0.065 (2.3) | 0.077 (2.7) | 0.128 (4.5) | 0.100 (3.5) | 0.105 (3.7) | 0.136 (4.8) |

What is claimed is:

1. In a method of producing a moisture- and heat-resistant flexible polyurethane foam from a raw material mixture of a polyhydroxyl compound, an organic polyisocyanate, water, a catalyst, a surfactant and a foaming agent, the improvement comprising adding 0.01–5 parts by weight based on 100 parts by weight of said polyhydroxyl compound of an amino acid or a compound selected from the group consisting of hydantoin, hydantoic acid, uric acid, L-pyrrolidone-5-carboxylic acid and DL-pyrrolidone-5-carboxylic acid to the raw material mixture as an additive, and foaming the resulting mixture.

2. A method according to claim 1, wherein said amino acid is a member selected from L-glutaminic acid, D-glutaminic acid, L-aspartic acid, DL-serine, L-alanine, DL-threonine, DL-valine and L-arginine.

3. A method according to claim 1, wherein said amino acid is L-glutaminic acid.

4. A method according to claim 1, wherein said compound is DL-pyrrolidone-5-carboxylic acid.

5. A method according to claim 1, wherein said amino acid or said compound is used in an amount of 0.3–3 parts by weight based on 100 parts by weight of the polyhydroxyl compound.

6. A method according to claim 1, wherein said additive is a mixture of the amino acid or a compound selected from the group consisting of hydantoin, hydantoic acid, uric acid, L-pyrrolidone-5-carboxylic acid and DL-pyrrolidone-5-carboxylic acid with 4,4'-bis-(α,α-dimethylbenzyl)diphenylamine and triphenyl phosphite.

* * * * *